May 3, 1960 F. NECHLEBA 2,935,678

TWO-STAGE DYNAMOELECTRIC AMPLIFIER MACHINE

Filed June 29, 1955

2,935,678
TWO-STAGE DYNAMOELECTRIC AMPLIFIER MACHINE

Franz Nechleba, Nurnberg, Germany, assignor to Siemens-Schuckertwerke Aktiengesellschaft, Berlin-Siemensstadt and Erlangen, Germany, a corporation of Germany Application June 29, 1955, Serial No. 518,815

Claims priority, application Germany July 3, 1954

2 Claims. (Cl. 322—87)

My invention relates to two-stage dynamoelectric amplifiers which comprise to direct-current generators in cascade connection with each other.

Dynamoelectric amplifying machines, used for control and regulating purposes, are desired, on the one hand, to have a large amplification factor, that is a large ratio of the generated power output to the power input that controls the field excitation of the machine. On the other hand, the excitation supplied by the input circuit is supposed to have a small time constant so as to rapidly respond to any changes in input intelligence. The ratio of amplification factor and time constant is defined as the "quality factor"; and this quality factor is one of the determining data for the size or type of machine to be used for any particular application.

It is an object of my invention to improve two-stage cascade-connected amplifying machines toward better control and regulating performance and better efficiency or economy. Another object of my invention is to facilitate manufacturing such machines so as to reduce production cost while maintaining or improving the quality of the machines.

To this end, and in accordance with a feature of my invention, I design and rate the first-stage machine of the cascaded pair of direct-current generators in accordance with the desired quality factor, that is in accordance with the desired ratio of amplification to time constant; and I design and dynamoelectrically rate the second-stage generator of the cascade, irrespective of that ratio, only in accordance with the power output to be furnished. The second-stage generator, of course, has a larger power output than the generator of the first stage; but according to further features of the invention, I make the armature diameter of the first stage equal to that of the second stage, and also give the component machines of both stages the same exterior diameters of their respective field structures.

Figure 1:
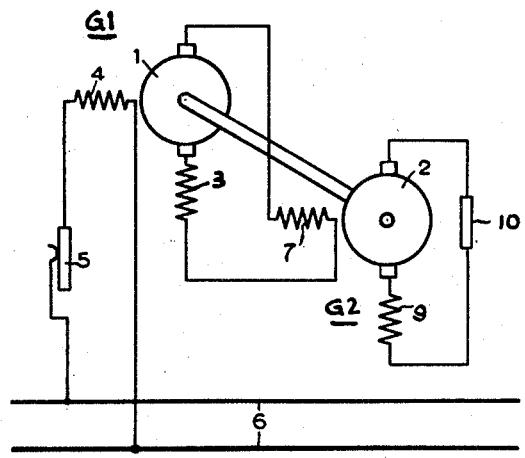
Figure 2:
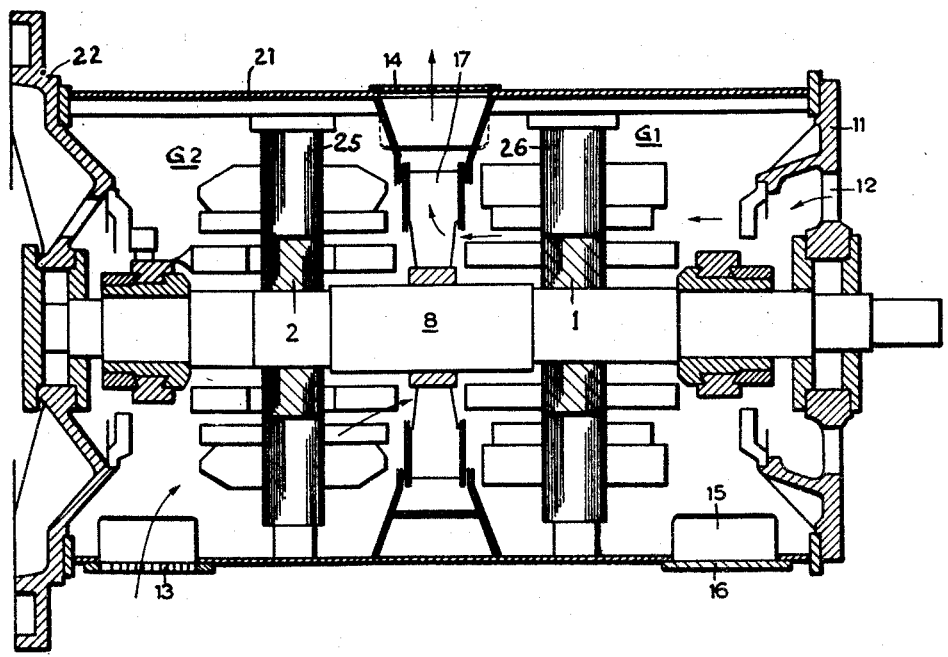

These and other objects and features of the invention will be apparent from the following, in conjunction with the drawing in which Figure 1 is a schematic circuit diagram of a machine according to the invention, and Figure 2 shows a longitudinal sectional view of the same machine.

According to Figure 1, the two-stage amplifying machine comprises two direct-current generators G1 and G2 whose respective armatures have a common shaft 8. The component generator G1 forms the first or input stage, and the generator G2 the second or output stage of the amplifier. Generator G1 has a series field winding 3 and a separately excited control field winding 4. Field winding 4 is excited through a controllable resistor 5 from a direct-current line 6. Generator G2 has a control field winding 7 connected in series with the armature 1 of generator G1, and has a series field winding 9 in the circuit of the load 10 to be energized by the power output of the armature 2.

As shown in Figure 2, the two component generators G1 and G2 of the cascade are mounted in a single housing formed by a cylindrical shell 21 and two bearing shields 11 and 22. The two shields carry respective bearings in which the common shaft 8 of the armatures 1 and 2 is journalled. The two armatures 1 and 2 have the same diameter. The corresponding stacks of laminations of the respective structures 25 and 26 have the same outer diameters. The bearing shield 11 has openings 12 for the entrance of cooling air. The shell portion 21 of the housing has a service opening closed by a perforated cover 13 and located at the opposite side of the machine so that air can pass through cover 13 into the interior. An air exit opening is provided in shell 21 between the two component generators and is closed by a perforated cover 14. Another service opening 15 is provided in shell 21 close to the bearing shield 11 and is covered by a non-perforated cover. A double-acting fan rotor 17 is mounted on shaft 8 in the vicinity of the air-outlet cover 14. The fan rotor inducts air from both sides, namely through axially located openings 12 and also through the openings in cover 13. From openings 12 the air passes along the generator G1 to the outlet openings in cover 14. On the other side of the machine, cooling air is inducted through the openings in cover 13 and passes along the generator G2 to the outlet openings in cover 14. The machine may be mounted for horizontal or vertical arrangement of its shaft and is driven from a constant-speed motor (not illustrated).

As mentioned, the output stage G2 of the cascade-connected pair of generators is to be dynamoelectrically dimensioned without reference to the quality factor desired of the machine set as a whole. That is, with respect to the output stage a relatively low quality factor is acceptable. However, the time constant of this stage should not be larger than is absolutely necessary. As far as the dimensioning of the appertaining excitation winding is concerned, a limit is given only by the requirement that the heating must stay below a given permissible limit. This determines the magnitude of the time constant of the output stage; and once the quality factor and the time constant are thus given or chosen, the amplification factor of the output stage is also definitely determined.

Two factors are mainly decisive for calculating the quality factor of a two-stage amplifying machine, namely the armature diameter of the first stage and the ratio of the time constant of the first stage to the time constant of the second stage.

Thus, the quality factor of the two-stage machine increases in accordance with a given law with an increasing armature diameter of the first stage. It is therefore possible, in principle, to give the quality factor any desired large magnitude by making the armature diameter of the input stage sufficiently large. A machine particularly favorable from manufacturing viewpoints, which also affords satisfactorily large magnitudes of the quality factor, is obtained if, according to the invention, the armature diameter of the first stage is made equal to the armature diameter of the second stage.

For increasing the ratio of the time constant of the first stage relative to the second stage and hence for increasing the quality factor, it would be desirable to make the time constant of the first stage as large as possible. However, since such a machine is to respond rapidly to changes in input intelligence, the overall time constant of the two-stage machine is supposed to be as small as possible. Consequently, a compromise is necessary, and the time constant of the first stage must be given a magnitude which, while sufficiently large, is not excessive from the viewpoint of rapid response. The values of the quality factors of the amplifying machine versus the ratio of the two time constants are located on an ascending curve. Beginning with the value 3:1 of this ratio, the curve becomes rather shallow so that a further increase in the ratio of the two time constants does not yield an appreciable increase in quality factor.

As mentioned, it is of advantage to make not only the diameters of the two armatures equal, but to also give the exterior diameters of the two generators approximately the same magnitude. In the latter case the two component generators have the same winding space for the pole coils. Since the input stage requires the provision of separate windings for excitation and control purposes, a correspondingly small winding space remains available for the fundamental field excitation, this winding space being approximately one-half as large as the winding space available in the output stage. Since, further, the time constant of an excitation winding is approximately proportional to the available winding space, the time constant of the input stage for the same exterior diameter of the generator can be made approximately one-half as large as the time constant of the output stage. Due to the lesser amount of saturation in the magnetic circuit of the input stage, the time constant of the input stage is actually slightly larger so that the ratio of the two time constants is between about 1:2 and 1:1.

In cross-field or armature-reaction excited amplifying machines the choice of the voltage in the armature circuit is of necessity limited to low values. With a small control excitation and a likewise small armature voltage in the output circuit, the commutator contact and brush resistance, which is always varying to some extent, may considerably affect the current in the cross-field circuit and may thus render the amplification unsteady, particularly when this varying brush or commutator resistance attains the order of magnitude of ohmic resistances. However, if the amplification is effected according to the invention by a cascade connection of two direct current generators, then the voltage at the armature terminals can be chosen independently of the output voltage and readily made so large that a detrimental effect of the brush or commutator resistance is virtually eliminated.

It will be obvious to those skilled in the art that, as to details in design and circuitry, various modifications can be made without departing from the invention and within the scope of the claims annexed hereto.

I claim:

1. A dynamo-electric amplifying machine comprising a housing, a shaft revolvable in said housing, two coaxial direct-current generators having respective armatures mounted on said shaft and having respective field systems stationarily mounted in said housing, said two armatures having the same diameter and said two field systems having substantially the same outer diameter, said two generators being cascade-connected with each other whereby one of said generators forms a first amplifying stage of small power output and the other generator forms a second amplifying stage of large power output, said first-stage generator having a higher ratio of amplification factor to time constant than said other generator, and said first-stage and second-stage generators having a ratio of their respective time constants between 1:2 and 3:1.

2. A dynamo-electric amplifying machine comprising a housing, a shaft revolvable in said housing, two coaxial direct-current generators having respective armatures mounted on said shaft and having respective field systems stationarily mounted in said housing, said two armatures having the same diameter and said two field systems having substantially the same outer diameter, said two generators being cascade-connected with each other whereby one of said generators forms a first amplifying stage of small power output and the other generator forms a second amplifying stage of large power output, said first-stage generator having a higher ratio of amplification factor to time constant than said other generator, and said first-stage and second-stage generators having a ratio of their respective time constants between ½ and 1.

References Cited in the file of this patent

UNITED STATES PATENTS 2,666,885    Bradley et al. _____ Jan. 19, 1954

FOREIGN PATENTS 493,375    Canada _____ June 2, 1953